Nov. 3, 1925.  
D. JAMES ET AL  
1,560,384  
WHEEL FOR TRACTORS AND CERTAIN FARMING IMPLEMENTS  
Original Filed Oct. 8, 1923

D. James and
W. H. Kendell
By John O. Seibert
Atty.

Patented Nov. 3, 1925.

1,560,384

UNITED STATES PATENT OFFICE.

DANIEL JAMES, OF ESSENDON, AND WILLIAM HENRY KENDELL, OF LUBECK, VICTORIA, AUSTRALIA.

WHEEL FOR TRACTORS AND CERTAIN FARMING IMPLEMENTS.

Original application filed October 8, 1923, Serial No. 667,105. Divided and this application filed January 3, 1925. Serial No. 319.

*To all whom it may concern:*

Be it known that we, DANIEL JAMES, a subject of the King of Great Britain, residing at Essendon, in the State of Victoria, Commonwealth of Australia, and WILLIAM HENRY KENDELL, a subject of the King of Great Britain, residing at Lubeck, in the State of Victoria, Commonwealth of Australia, have invented new and useful Improvements in and Relating to Wheels for Tractors and Certain Farming Implements, of which the following is a specification.

This invention relates to improvements in and connected with the wheels of tractors and certain farm implements such as cultivators, combined seed drills and cultivators and the like, but is directed more particularly to the wheels of farm tractors. The subject-matter of the present application has been divided from our application Serial No. 667,105 filed 8th October, 1923.

The primary object of the invention is to provide improvements in the wheels of farm tractors, whereby the machines can be operated satisfactorily even under adverse climatic conditions such as exist in wet seasons or after heavy rain when the soil is rendered very soft and is of adhesive character.

A further object is to provide a wheel having an effective surface grip and provided with means to automatically free adhering soil whilst the machine is at work, whereby the wheel tread is maintained in a relatively clean condition although operating in moist and adhesive soils.

A still further object is to provide an improved construction of tractor wheel associated with a cleaning attachment whereby greatly improved seed-bed conditions will be obtained. This result is achieved by eliminating that damage to a field surface now occasioned by the operation of tractors after rain, when wheel track depressions are made in the field, and soil adhering to the wheels is compressed into said depressions under the weight of the machine.

Referring to the accompanying drawings:—

Figure 1:
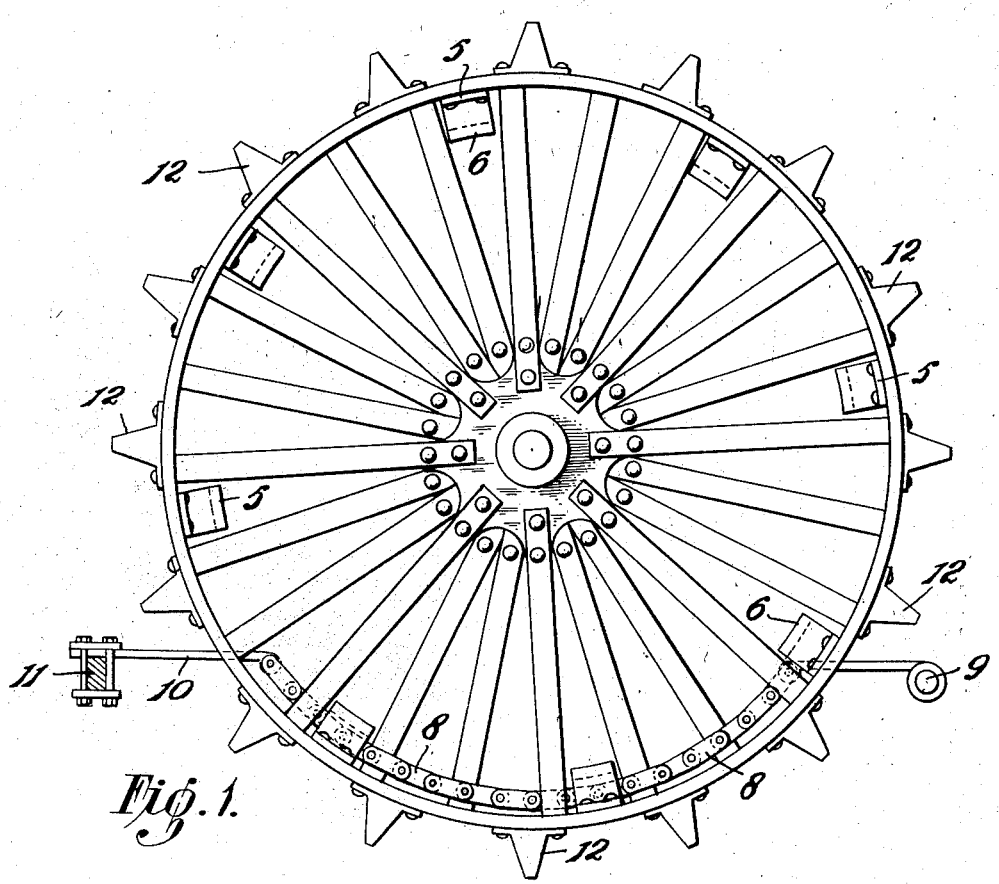
Figure 1 is a view in side elevation of a tractor wheel with automatically operating cleaning devices according to the invention.
Figure 2:
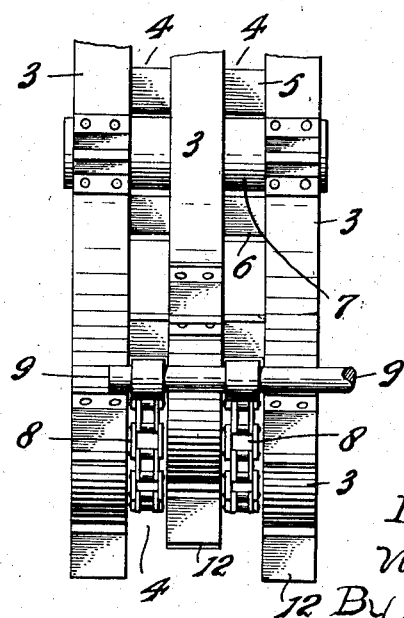
Figure 2 is a fragmentary view in end elevation of the wheel and its associated cleaning devices.

We provide a main travelling wheel for a farm tractor having its rim composed of a plurality of annular elements of corresponding diameter and arranged in parallel relationship. The rim elements 3 are constructed in the form of annular bands of flat metal, and in the construction illustrated there are three of said annular metallic bands, each of which is approximately four inches in width, while the intervening clearance spaces 4 are approximately three inches in width, thus providing a wheel rim having a width of approximately eighteen inches. The said rim elements are secured together at the required distances apart by means of a series of transverse connecting bars 5, which are circumferentially distanced and function as distance pieces.

The connecting bars 5 are constructed of wrought or cast metal (preferably steel) and each is formed with two U-shaped members 6 having a width corresponding to that of said clearance spaces 4, with which they register when fitted to the rim elements.

The said metal connecting bars are rigidly secured to the interior surfaces of the flat metal rim elements by means of rivets or other approved fastening means, and they are of such number and spaced equidistantly to provide effective bracing and reinforcement, whereby the wheel will possess the requisite degree of durability.

The spaces 4 between the rim elements 3 and the spaces 7 between the transverse connecting bars provide ample clearance for the free passage of soil, which is initially broken and then removed from the exterior rim surface by the action of cleaning devices arranged and operating as hereinafter described.

The depth of said U-shaped members 6 formed on the transverse connecting bars 5 is such as will permit of free action therein between the rim elements 3 of wheel cleaning devices without metal to metal contact of the integers such as would cause undue friction.

These wheel cleaning devices comprise flexible chains 8, which are accommodated within the clearance spaces 4 provided between the rim elements 3 and extend around a portion of the circumference of the wheel.

The forward end of each of said chains 8 is pivotally attached to a rod 9 secured to the chassis of the tractor and extending transversely in advance of the wheel, while the rear end of each of said chains is pivotally attached to a bar 10 fastened to a transverse bar 11, that is supported from a rear part of the chassis and is disposed rearwardly of the wheel. The rear ends of said chains 8 are preferably anchored closer to the ground level than are their forward ends—see Figure 1.

Each rim element 3 is provided with tread grip devices 12, which are preferably of the well-known "spade" type, and the grips on the intermediate rim element are positioned midway between the corresponding grips that are affixed to the outer and to the inner of said rim elements.

In the operation under dry weather conditions of a tractor equipped with wheels as described, the combined widths of the rim elements 3 provide adequate surface grip, and the wheels by reason of the series of transverse connecting bars 5, which function as braces, will be found to be rigid and durable. When the tractor is working in wet, soft and adhesive soil, (conditions which obtain in wet seasons and following heavy rainfall), the advantages of our improvements are made apparent. Slippage of the wheels is avoided, while the soil that adheres to the rim in the form of a false tyre is broken by the chains 8 operating within the clearance spaces 4. The breakage of the false rim or tyre of adhering soil by the said chains acting between the rim elements results in the loosening of soil carried by the rim elements themselves, so that the rim of the wheel is maintained relatively clean, even when the tractor is working in very wet and adhesive soil, and the soil so broken and loosened is disintegrated by the action of said cleaning chains and passes through the clearance spaces 4 and 7 and over the edges of said rim elements 3 to completely fill the depressions initially formed in the seed-bed by the tractor wheels.

Although our improvements are directed specially to wheels of farm tractors, it will be understood that the same may be applied to the wheels of certain farming implements such as cultivators and combined grain drills and cultivators, whose satisfactory operation in wet and adhesive soils is to a material degree dependent upon the maintenance of the wheels in a relatively clean condition by automatic removal of adhering soil without necessitating stoppage of cultivation operations for the purpose.

The term "tractor" in the appended claims is, therefore, to be understood to embrace wheels of cultivating implements of the character indicated.

What we do claim is:

1. A tractor wheel having a plurality of annular rim elements arranged in parallel spaced relationship, transverse bars rigidly connecting said rim elements, transverse rods anchored one in advance of and the other rearwardly of the wheel, and cleaning chains secured to said rods and operating interiorly of the wheel perimeter within the clearance spaces betwen adjacent rim elements.

2. A tractor wheel according to claim 2, wherein the bars connecting the rim elements are formed with U-shaped members that register with the clearance spaces between said rim elements.

In testimony whereof we affix our signatures.

DANIEL JAMES.
WILLIAM HENRY KENDELL.